Figure 1:
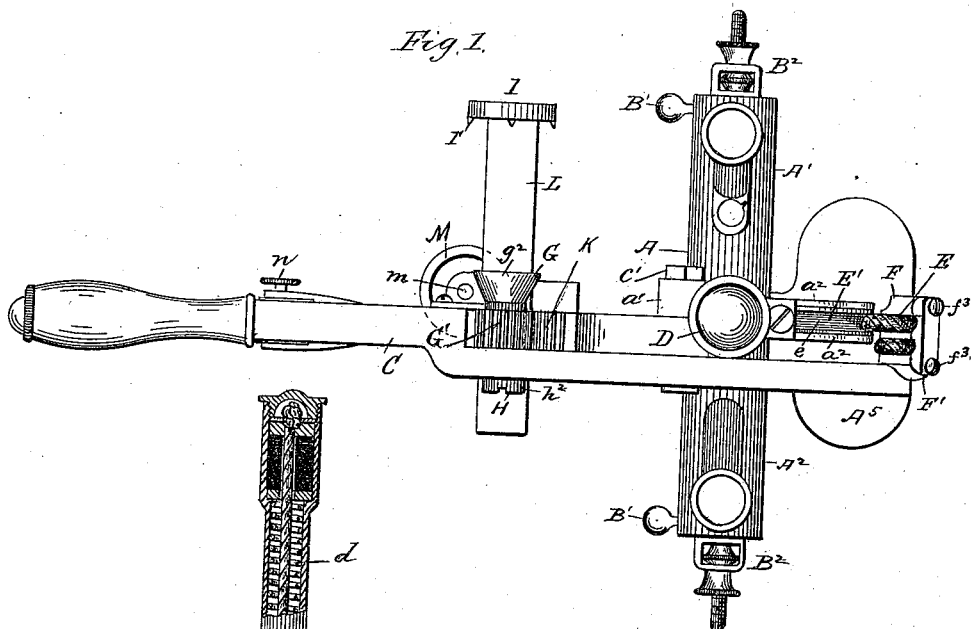

(No Model.) 2 Sheets—Sheet 1.

G. D. HUNTER.
CARTRIDGE LOADING MACHINE.

No. 381,499. Patented Apr. 17, 1888.

Witnesses:
T. R. Stuart.
L. S. Bacon.

Inventor:
George D. Hunter,
By Marble + Mason,
Attys.

N. PETERS, Photo-Lithographer, Washington, D. C.

(No Model.)
G. D. HUNTER.
CARTRIDGE LOADING MACHINE.
No. 381,499. Patented Apr. 17, 1888.
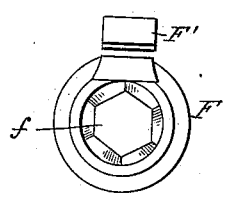
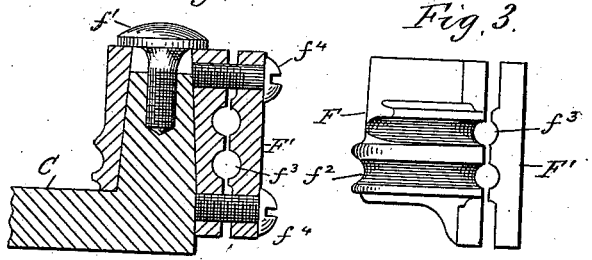
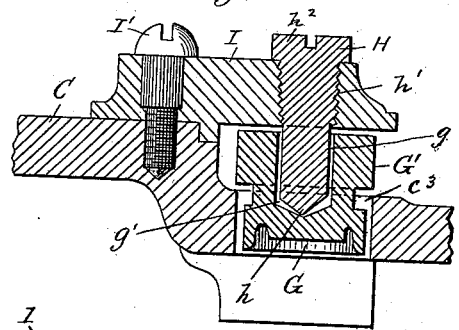
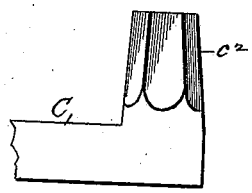
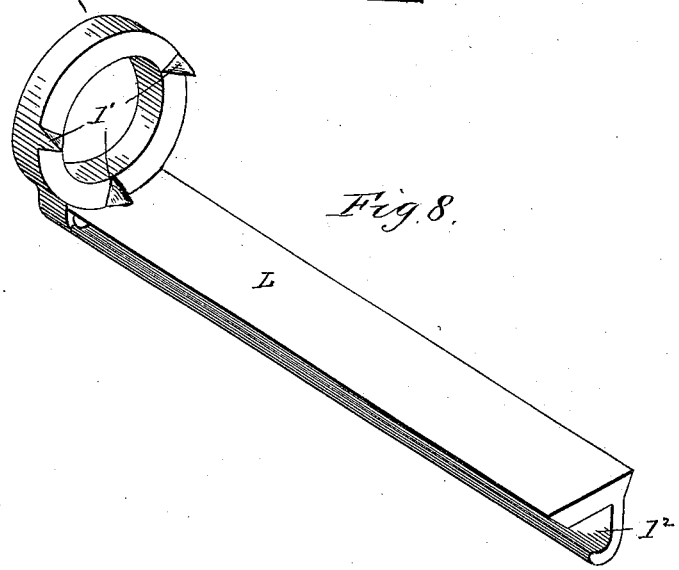
Witnesses:
T. R. Stuart
L. S. Bacon
Inventor:
George D. Hunter,
By Marble + Mason,
Attys.

UNITED STATES PATENT OFFICE.

GEORGE D. HUNTER, OF AUBURN, ILLINOIS, ASSIGNOR OF ONE-HALF TO ELIZABETH HUNTER, OF SAME PLACE.

CARTRIDGE-LOADING MACHINE.

SPECIFICATION forming part of Letters Patent No. 381,499, dated April 17, 1888.

Application filed November 19, 1887. Serial No. 255,622. (No model.)

*To all whom it may concern:*

Be it known that I, GEORGE D. HUNTER, a citizen of the United States, residing at Auburn, in the county of Cook and State of Illinois, have invented certain new and useful Improvements in Cartridge-Loading Machines; and I do hereby declare the following to be a full, clear, and exact description of the invention, such as will enable others skilled in the art to which it appertains to make and use the same.

My invention relates to a portable machine for loading cartridge-shells with powder and shot; and it consists in certain improvements upon the machine heretofore invented by me, and for which application for Letters Patent was filed June 24, 1887, Serial No. 242,396.

The essential features of my present improvements on the machine disclosed in my application just named consist, first, in so constructing the frame or casing as to strengthen it and adapt it to be more solidly secured to a table, bracket, or other suitable support; second, in providing a bracket or shelf just beneath the wad opening for receiving and supporting the wads in loading and preventing them from dropping or being misplaced when inserting them through said opening and into the shell-holding cylinder, and in so locating said shell-holding cylinder as to expose the wad-opening when inserting the wad, and to securely close said wad-opening, and thus avoid danger when the contents of the powder-measuring cylinder are moved across said opening and delivered to the shell; third, in securing the cord to a holder mounted upon the end of the hand-lever without injury to the cord, and by such means that it may be easily drawn taut and then secured; fourth, in so securing the hand-lever and the cord-holder to the frame or casing that either or both of them may be readily removed when the machine is to be packed; fifth, in connecting the hand-lever and cord with the upper end of the spring-lifted rammer in a direct line and simple manner, so as to relieve the cord of undue strain and apply the power of the spring more effectively for restoring the hand-lever to its raised position; sixth, in supporting the crimper and crimping-wheel in a simple, compact, and effective manner, so as to avoid friction upon its bearings and partially or wholly inclosing the same compactly within the hand-lever; seventh, in adjusting the grip-lever upon the hand-lever, so as to suit cartridges of various sizes or lengths; eighth, in shielding the cord and guiding the same from the said grip-lever to the outer end of the cartridge-carrier, and in lightening and strengthening said cartridge-carrier; ninth, in so securing the bushing within the shell-holding cylinder as to resist more effectively the thrust of the rammer, all of which will be fully described with reference to the accompanying drawings, wherein the same reference-letters indicate the same parts, and wherein—

Figure 2:
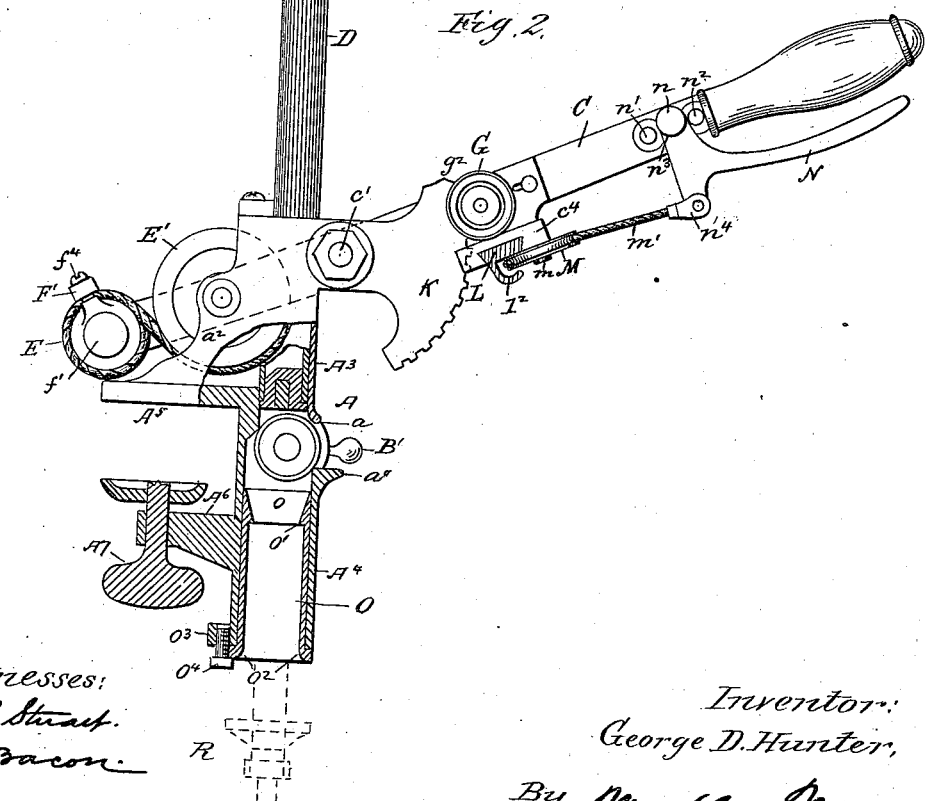

Figure 1 represents a plan view of the machine with the powder and shot canisters removed; Fig. 2, a transverse vertical section of some of the parts through the middle portion of the machine, other parts being shown in side elevation; Figs. 3, 4, and 5, enlarged details, respectively in plan, horizontal section, and end elevation, of the cord-holder, adapted to be secured to the rear end of the hand-lever; Fig. 6, a detail showing the hexagonal laterally-projecting pin on the end of the hand-lever, and adapted to fit a correspondingly-shaped opening in the cord-holder; Fig. 7, a detail horizontal section through the hand-lever, the combined crimping-wheel and cog-gear, the pivot stud or bolt, and the stud-rest; and Fig. 8, a detail perspective view of the cartridge-carrier, showing the rib beneath the same having an open groove or channel, forming the shield and guide for the cord.

It is found necessary to show and briefly describe various parts of my former machine above referred to, in order to disclose a complete embodiment of my present improvements.

The casing A, which supports the movable parts of the machine, has been changed in the form and location of its parts, so as to secure greater stability, and consists of cylindrical guide-chambers $A'$ $A^2$, located in the same horizontal axial line and in advance of the axial line of the vertical rammer-guide cylinder $A^3$ and shell-holding cylinder A⁴, as will hereinafter appear.

As the guide-cylinders radiate from a common center and the shell-holding cylinder and rammer-guide cylinder radiate from a center coincident therewith, the point of intersection of said parts will be subject to the greatest strain, and this is in the present form of the machine the point from which the clamping-jaws A⁵ A⁶ project rearwardly from the casing. These jaws are quite broad and cast integrally with the casing, and thus serve not only to thicken and strengthen the frame at its weakest point by the increased breadth and bulk of metal, but also serve to support the frame at said point of intersection of the cylinders, in order that the strain upon the hand-lever and rammer will not be sufficient to cause great pressure upon the rammer-guide cylinder or deflect the same from its alignment with the shell-holding cylinder. A clamping-screw, A⁷, passing through the jaw A⁶, binds against the under side of the bench or table upon which the machine is supported and clamps it thereto.

As the horizontal axial line of the guide-chambers is located forward of the vertical axial line of the shell-holding cylinder, and as the diameter of the shell-holding cylinder is greater than the diameter of the rammer-guide cylinder, as shown in Fig. 2, the wad-opening $a$ and the upper end of the shell-holding cylinder will project outwardly or forwardly from the face of the remaining portion of the casing, so as to more fully expose said opening for receiving the wad and permit the measuring-cylinders to perfectly close the wad-opening when said cylinders are delivering their contents into the cartridge-shell. Beneath said wad-opening $a$, and at the upper end of the shell-holding cylinder, and cast integrally therewith, is a bracket or shelf, $a''$, which supports the wads when loading, or prevents them from being misplaced or dropped as they are being inserted through said opening into the shell-holding cylinder and upon the charges of ammunition delivered from the measuring-cylinders. These measuring-cylinders are not shown in the drawings, as they form no part of my present improvements; but they are fitted and movable within the guide-chambers and receive the charges of powder and shot and deliver the same into the upper ends of the shells in the shell-holding cylinder, as in my former application. B' B' represent weighted pins or knobs for moving said measuring-cylinders back and forth within the guide-chambers A' A², and B² B² represent the devices for adjusting the capacity of said measuring-cylinders, also as in my former application. Each measuring-cylinder is moved partially across the upper end of the shell-holding cylinder for delivering its charge.

The hand-lever C is pivotally supported upon a bolt, $c'$, passing through the same and through a boss, $a'$, formed upon the casing and arranged above the wad-opening and at the upper end and forward side of the rammer-guide cylinder; also, said hand-lever projects forward of the casing at its front end and across the same at its rear end. The rear end thereof is connected by novel means to the cat-gut cord E, which is connected to the upper end of the rammer D, which fits within the rammer-guide cylinder A³, and is reciprocated therein downwardly by said cord and pressure of the hand-lever and upwardly by the spiral spring $d$, inclosed within the cylindrical chamber $d'$ at the upper end of the rammer. The cord E passes up through the spiral spring $d$ and the rammer D, and is secured to the upper end thereof. It also passes beneath a single grooved pulley, E', journaled in parallel webs $a²$ of the casing and onto the rear end of the hand-lever, where it is secured.

The hand-lever passes and oscillates alongside of the cord-pulley E', and is provided at its rear end with a laterally-projecting pin, $c²$, which tapers toward its end, is hexagonal in cross-section, and passes through a correspondingly-tapering hexagonal-shaped hole, $f$, in the cord-holding sleeve F, which is fitted thereon and secured thereto by a screw, $f'$, passing into the end of said pin $c²$. This cord-holding sleeve F has a spiral groove, $f²$, passing one and a half times around it, (more or less,) for receiving the coiled end of the cord E; also, a clamping-plate, F', having cord-grooves $f³$, is secured by screws $f⁴$ to the cord-holding sleeve, and holds the coiled end of said cord securely upon said sleeve, and thus is provided a simple and strong connection between the cord and the rear end of the hand-lever without kinking, mashing, or breaking said cord.

As the holding sleeve F is attached at the rear end of the hand-lever and holds the cord considerably above the bottom of the cord-pulley E', and as the tendency of the spiral spring $d$ is to prevent the rammer and cord from moving downward voluntarily, it will be obvious that the front end of the hand-lever will be firmly held at the highest point of its raised position, the downward pulling strain upon the cord from the weight of the front end of the hand-lever being resisted by the upward pressure of the spring; also, as the pulley E' projects into a vertical slot in the rear side of the rammer sufficiently for the axial line of said rammer to be tangent to the center of the peripheral groove $e$ in said pulley, which is of large diameter, the cord E will pass half-way around the same and be carried upwardly to the holding-sleeve F upon the rear end of the hand-lever, without unduly straining or compressing its strands and thereby weakening it. The cord will thus last longer, the lever will work easily, and will be held staunchly in its raised position, with the rammer elevated to clear the path of the measuring-cylinders.

The sleeve F may be taken off the end of the hand-lever by removing the screw $f'$ without disturbing the adjustment of the cord, and it may again be easily secured to said hand-lever without reclamping or readjusting the cord; also, the hand-lever may be removed from the machine without loosening the cord-fastening, as when it is desired to pack the machine in a valise or the like for transportation. If the cord requires readjusting, the sleeve F is taken off and turned to bring any one of its hexagonal sides in contact with any one of the hexagonal sides of the pin $c^2$, thus winding the cord more or less upon said sleeve and making and keeping the same taut.

The crimping-wheel G and cog-wheel G' are formed integrally and mounted upon a stud or pivot-bolt, H, which passes through the hand-lever C, as shown in Fig. 1, or through a stud-rest, I, attached to said lever, as shown in Fig. 7, said pivot-bolt in both instances forming the sole support for said crimping-wheel and cog-wheel. This stud or pivot bolt, as shown in Fig. 7, is supported upon the hand-lever concentrically with a hole, $c^3$, formed therethrough. The crimping-wheel and cog-wheel have a centrally-bored recess, $g$, formed with a conical bottom, $g'$, which receives the conical end $h$ of said pivot-bolt, the said conical end being of sharper pitch than the conical bottom $g'$, thus reducing the friction of the crimping-wheel upon its bearings to a minimum and allowing it to extend freely into the hand-lever. The pivot-bolt H is screw-threaded at $h'$, adjacent to its head $h^2$, and passes through and is screwed into the stud rest I, which is secured by a screw-bolt, 1', to the hand-lever. The cog-pinion G' is of greater diameter than the hole in the hand-lever, and thus prevents the crimping-wheel from passing through said hole and being displaced from the end of the pivot-bolt. This pinion gears with a stationary segment-rack, K, cast upon the casing A, concentric with the pivot-bolt $c'$ of the hand-lever. By this means the crimping-wheel is rotated first in one and then in the other direction during the vibrating movement of the hand-lever, and thus operates to effect the crimping of one shell simultaneously with the ramming of the charges into another shell. Under this construction and arrangement of parts the crimping-wheel is supported securely without touching the walls of the recess $g$, and receives the thrust of the cartridge while being crimped solely upon the conical end $h$ of the pivot-bolt, and thus prevents the face of the cog-wheel from bearing against the side of the hand-lever or the inside of the stud-rest I. A simple and compact arrangement of parts easily taken apart is thus obtained, and the friction upon the crimping-wheel bearings is reduced to a minimum.

The crimping-wheel G is formed with a flaring opening or "bell-mouth," $g^2$, as shown in Fig. 2, so as to permit of more readily entering the ends of shells therein than is possible when the opening or mouth leads straight into the crimping device.

The cartridge-carrier L is supported to slide endwise within guides $c^4$, arranged transversely upon the under side of the hand-lever C and beneath the crimping-wheel, and has an end abutment, $l$, provided with spurs $l'$, to receive the rear end of the cartridge.

A horizontally-arranged sheave-pulley, M, supported upon a screw-bolt, $m$, upon the under side of the hand-lever C, receives a cord, $m'$, which is secured at one end to the outer or abutment end of the cartridge-carrier L and at the other end to a grip-lever, N, which is pivoted by a pin, $n$, in any one of a series of holes, $n'$ $n^2$ $n^3$, in the hand-lever. By changing the pivot-pin $n$ from one to the other of the holes in the hand-lever the movement of the carrier L may be increased or diminished to suit cartridges of various lengths. The arrangement of the grip-lever N and sheave-pulley M is such that the cord $m'$ will pass in a horizontal plane or parallel with the hand-lever and the cartridge-carrier, and thus exert a direct and free pull upon said carrier in the line of its movement. The wire cord is properly adjusted or positively held in the groove of the pulley M by having its front end secured to a jointed or pivoted projection, $n^4$, secured to the lower extension of the grip-lever, as shown in Fig. 2.

The under side of the cartridge-carrier has a rib formed with an open groove or channel, $l^2$, passing centrally the entire length thereof, to receive the cord $m'$, to serve as a shield therefor, and also to hold the same at all times in a line tangent to the sheave-pulley M, and be held within the groove thereof. This open-sided rib upon the under side of the cartridge-carrier not only acts as a guide and shield for the cord, but serves to stiffen and strengthen the carrier and admit of its being made both light and strong.

The shell-holding cylinder $A^4$ is fitted with a bushing, O, of suitable bore to receive the cartridge-shell, and has a conically-tapering mouth, $o$, an abutment-shoulder, $o'$, at its upper end, and an outwardly-projecting flange, $o^2$, at its lower end. A lug, $o^3$, projecting laterally from the lower end of the shell-holding cylinder, is bored and screw-threaded to receive a clamping-screw, $o^4$, passing upwardly through it and bearing with its head beneath the flange $o^2$ of the bushing O, so as to force said bushing solidly up to its seat and hold it securely against the downward thrust of the rammer.

The cartridge-shell is held up within the bushing O by the rest-plate R, which is supported upon a bracket hinged to the shell-holding cylinder $A^4$, and locked thereto in an upright position by a pivoted latch-lever, as fully disclosed in the application above referred to.

The operation of my present machine does not differ materially from that of the machine previously invented by me and above referred to, and, briefly stated, consists in first raising the latch-lever and swinging the bracket to one side and then passing the empty shell up into the shell-holding cylinder. The rest-plate is then dropped beneath the shell and secured in such position until said shell is properly filled and ready to be crimped. The powder and shot are then measured and deposited in the mouth of the shell-holding cylinder in proper order, a wad or wads being inserted upon the top of each charge of powder and upon each charge of shot, said wads being separately rammed by vibratory movements of the hand-lever. While the charges are being rammed into one shell, the cartridge previously filled, having been first removed from the shell-holding cylinder, is placed in the cartridge-carrier with its open end in contact with the bell-mouthed crimping-wheel. The grip-lever is then grasped firmly while the hand-lever is vibrated, and the rim of the cartridge is turned in or crimped sufficiently to hold the load securely within the shell.

Having thus fully disclosed the construction, arrangement, and operation of the various parts of my invention, what I claim as new is—

1. In a cartridge-loading machine, the integrally-formed frame or casing consisting of the vertically-arranged rammer-guide and shell-holding cylinders, the horizontally-arranged cylindrical guide-chambers radiating from coincident centers, and broad clamping-jaws projecting from said central point in the same plane with and in rear of said guide-chambers, in combination with the clamping-screw, the rammer, the cord, hand-lever, and measuring-cylinders, substantially as described, for the purpose specified.

2. In a cartridge-loading machine, the integrally-formed frame or casing consisting of vertically-arranged rammer-guide and shell-holding cylinders, the latter having a wad-opening at its upper end, and horizontally-arranged cylindrical guide-chambers located upon opposite sides of said rammer-guide and shell-holding cylinders and in advance of the axial line of the same, so as to properly expose said wad-opening, and also close its top, bottom, and sides at intervals, in combination with the measuring-cylinders, the rammer, the cord, and the hand-lever, substantially as described.

3. In a cartridge-loading machine, a casing comprising horizontal guide-chambers and vertical rammer-guide and shell-holding cylinders, the shell-holding cylinder being formed with a wad-opening at its upper end, and with a stationary bracket or shelf arranged beneath said opening for receiving and supporting wads while loading and for preventing them from dropping, substantially as described.

4. In a cartridge-loading machine, the casing, having a shell-holding cylinder, in combination with a hand-lever pivoted to the casing, a spring-actuated rammer supported within the casing, and a cord secured to the rammer, and also to a detachable cord-holding sleeve secured to the rear end of said hand-lever, substantially as described.

5. In a cartridge-loading machine, the combination, with the casing having a shell-holding cylinder, of the spring-actuated rammer, the hand-lever, the cord secured to the said rammer, and the cord-holding sleeve fitted upon said hand-lever and having spiral grooves to receive the said cord and a clamping-plate for securing it therein, substantially as described.

6. In a cartridge-loading machine, the casing having a shell-holding cylinder, in combination with the spring-actuated rammer supported upon said casing, a hand-lever pivoted to the casing, a cord secured to the rammer, and a cord-holding sleeve having a polygonal opening fitted upon a correspondingly-shaped pin projecting from said hand-lever for securing and adjusting the cord thereon, substantially as described.

7. In a cartridge-loading machine, the casing having a shell-holding cylinder, in combination with the spring-actuated rammer supported upon said casing, a cord secured to the rammer, a hand-lever pivoted to the casing and having a laterally-projecting pin, a cord-holding sleeve fitted upon said pin, and a screw for securing the said sleeve thereon, substantially as described.

8. In a cartridge-loading machine, the casing having shell-holding and rammer-guide cylinders, in combination with the spring-actuated rammer inclosed within said guide-cylinder, a single-grooved pulley supported upon the casing with its periphery tangential to the central axis of said guide-cylinder, a hand-lever pivoted to the casing, and a cord connecting the rammer with the hand-lever at a point above the lower portion of said pulley, substantially as and for the purpose described.

9. In a cartridge-loading machine, the combination, with the casing, of a vibratory hand-lever, a revolving crimping-wheel pivoted upon said lever, and having a gear-pinion formed integrally therewith, and having a central recess formed axially therein, and a stud or pivot bolt supported upon said lever, and having a conical end fitted within the axial recess of said crimping-wheel, substantially as and for the purpose described.

10. In a cartridge-loading machine, a casing comprising horizontal guide-chambers, vertical rammer-guide and shell-holding cylinders, and a segment-gear, in combination with a hand-lever pivoted to the front of said casing, and the combined crimping-wheel and gear-pinion pivoted to said hand-lever, said crimping-wheel being formed with a flaring or bell-shaped mouth, substantially as and for the purpose described.

11. In a cartridge-loading machine, the combination, with the casing, of the vibratory hand-lever C, the revolving crimping-wheel G, having an axial recess, $g$, the stud or pivot bolt H, fitted within said recess, the stud-rest I, and the screw-bolt I', substantially as and for the purpose described.

12. In a cartridge-loading machine, the combination, with the casing, of the vibratory hand-lever, the rotary crimping-wheel supported upon said lever, a movable cartridge-carrier mounted upon said hand-lever, a grip-lever adjustable upon said hand-lever, and a cord connecting the same with said cartridge-carrier, substantially as and for the purpose described.

13. The combination of the stationary segment-gear, the vibrating hand-lever pivoted thereto, and the rotary crimping-wheel supported upon said hand-lever, with a movable cartridge-carrier mounted upon said hand-lever, a grip-lever provided with a pivoted projection upon its lower extension, and a cord passing around a sheave-pulley and connecting said pivoted projection with said cartridge-carrier, substantially as described.

14. The combination of the stationary segment-gear, the vibratory hand-lever pivoted thereto, and the rotary crimping-wheel supported upon said hand-lever, with a movable cartridge-carrier mounted upon said hand-lever, an adjustable grip-lever provided with a pivoted projection upon its lower extension, and a wire cord passing around a sheave-pulley and connecting said pivoted projection with said cartridge-carrier, substantially as described.

15. In a cartridge-loading machine, the combination, with the casing, of the vibratory hand-lever, a rotary crimper supported upon said lever, a movable cartridge-carrier fitted in guides upon said hand-lever, and having a grooved or channeled rib extending beneath the same, a cord fitted and guided within said grooved rib, a grooved horizontally-arranged pulley, and a grip-lever, substantially as and for the purpose described.

16. In a cartridge-loading machine, the casing having a shell-holding cylinder, $A^4$, provided with a lug, $o^3$, and a cylindrical bushing, O, having a flanged lower end, $o^2$, and fitted within said shell-holding cylinder, and a clamping-screw fitted into said lug and against said flange, so as to press upwardly against the flange of said bushing, in combination with the rammer and mechanism for operating the same, substantially as described.

In testimony whereof I affix my signature in presence of two witnesses.

GEO. D. HUNTER.

Witnesses:
S. F. WARREN,
H. SEWELL.